United States Patent [19]

Rink et al.

[11] Patent Number: 5,174,421
[45] Date of Patent: Dec. 29, 1992

[54] DAMPER IN THE FORM OF A SHOCK ABSORBER

[75] Inventors: Manfred Rink, Cologne; Gerhard Heese, Leichlingen, both of Fed. Rep. of Germany

[73] Assignee: Bayer Aktiengesellschaft, Fed. Rep. of Germany

[21] Appl. No.: 806,147

[22] Filed: Dec. 12, 1991

Related U.S. Application Data

[63] Continuation of Ser. No. 573,232, Aug. 24, 1990.

[30] Foreign Application Priority Data

Sep. 9, 1989 [DE] Fed. Rep. of Germany ....... 3930137

[51] Int. Cl.⁵ .............................................. F16F 7/52
[52] U.S. Cl. ...................................... 188/374; 74/492; 188/372; 293/133
[58] Field of Search ................. 188/372, 374, 268; 267/134; 293/132, 133; 74/492

[56] References Cited

U.S. PATENT DOCUMENTS

| | | | |
|---|---|---|---|
| 3,583,530 | 6/1971 | De Venne | 293/133 X |
| 3,696,891 | 10/1972 | Poe | 188/374 X |
| 3,899,047 | 8/1975 | Maeda et al. | 188/374 |
| 3,988,389 | 10/1976 | Margotte et al. | 525/67 |
| 4,482,672 | 11/1984 | Neuray et al. | 525/67 |

FOREIGN PATENT DOCUMENTS

| | | | |
|---|---|---|---|
| 2555832 | 5/1985 | France . | |
| 1441672 | 7/1976 | United Kingdom | 293/133 |

Primary Examiner—George E. A. Halvosa
Attorney, Agent, or Firm—Connolly & Hutz

[57] ABSTRACT

An inexpensive damper adapted to the stress frequency in the form of a shock absorber, in particular for vehicle seats, consists of an abutment (8), in which an absorber sleeve (2) of a thermoplastic material with a piston (1) guided therein with expansion bead (10) is clamped, wherein the absorber sleeve (2) is composed of a thermoplastic material having a tensile strength $\sigma_R$ of at least 40 MPa, an elongation at break $\epsilon_R$ of at least 60%, a tensile stress at yield $\sigma_S$ of at least 40 MPa and an elongation at yield $\epsilon_S$ of at least 3.5% (according to ISO/R 527 or DIN 53 455 in each case).

6 Claims, 2 Drawing Sheets

DAMPER IN THE FORM OF A SHOCK ABSORBER

The present application is a continuation of application Ser. No. 573,232, filed Aug. 24, 1990.

The invention relates to a damper in the form of a shock absorber consisting of an absorber sleeve of plastics material and a piston co-operating therewith, wherein the piston (1, 21) is arranged inside the absorber sleeve (2, 22) and has as least one expansion bead (10, 30; 31), of which the external diameter is greater than the internal diameter of the undeformed absorber sleeve.

Dampers in the form of shock absorbers which absorb high energy over a short distance, in particular during collisions between vehicles, are known. They are used for vehicle seats, bumpers and the like, but, if suitably dimensioned, can also be used universally.

It is normal to use hydraulic dampers. Although they are very effective, they are also very expensive, are designed for many thousands of load cycles and are relatively heavy.

As a less expensive solution (DE-OS-29 18 280), attempts have already been made to insert a lid-like piston against an absorber sleeve of duroplastic material (epoxide resin) with a wound glass fibre inlay. However, such a shock absorber can only be loaded once as the sleeve is desirably destroyed due to the high stress occurring. Moreover, it can only be loaded in one direction.

A buffer gear on railway vehicles is known from DE-AS 1 074 618, which consists of a buffer with a piston-like end penetrating into the end of a tubular, i.e. sleeve-like pressure-transmitting member. This pressure-transmitting member extends from one carriage end face to the other and widens under impact due to the piston-like end of the buffer penetrating more deeply. A buffer is only effective in one direction in each case.

Dampers are also known in which a piston with an expansion bead is immersed into a metal sleeve provided with an internal liner of rubber or plastics material (GB-PS 1 039 300) or into a sleeve of rubber alone, wherein the expansion bead, as described at the outset, has a greater external diameter than the internal diameter of the sleeve or of the internal liner. Dampers of this type are designed as bearing elements for vibrating machines or machine parts, such as washing machines or vehicle engines. They are not suitable as shock absorbers.

The object is also to design dampers of this type such that they can also be used as shock absorbers and, in particular, allow repeated stressing, more specifically in both directions.

The object is to provide an inexpensive damper for shock absorption which is adapted to the stress frequency, can be stressed several times and, in particular, is operative in both directions.

This object is achieved in that the absorber sleeve is composed of a thermoplastic material having a tensile strength $\sigma_R$ of at least 40 MPa, an elongation at break $\epsilon_R$ of at least 60%, a tensile stress at yield $\sigma_S$ of at least 40 MPa and an elongation at yield $\epsilon_S$ of at least 3.5% (according to ISO/R 527 or DIN 53 455 in each case).

Thermoplastic materials having these physical properties guarantee optimum behaviour during appropriate stressing, in particular with respect to the contraction of the absorber sleeve to its original external diameter after stressing. Thermoplastic materials with values below this can also be used, but sometimes experience undesirable plastic deformation which could limit the capacity for repeated stressing.

Particularly good results can be achieved with plastics materials having a tensile strength $\sigma_R$ of about 50 MPa and an elongation at break $\epsilon_R$ of about 85% as well as a tensile stress at yield $\sigma_S$ of about 55 MPa and an elongation $\epsilon_S$ of about 5.5%. The elongation modulus $\epsilon_Z$ should be about 2200 MPa.

A thermoplastic blend of polycarbonate and acrylonitrile-butadiene-styrene-copolymers of the type described in DE-OS-22 59 565 and DE-OS-23 53 428 (both corresponding to U.S. Pat. No. 3 988 389) is particularly suitable.

A blend of polycarbonate and polybutylene terephthalate, described in DE-OS-31 18 526 (corresponding to U.S. Pat. No. 4 482 672) is also particularly preferred as material for the absorber sleeve.

Such mixtures are distinguished by the particular stability to ageing of the rubber contents.

The novel damper is distinguished by its compactness with high energy absorption as well as low weight. It is operative in both directions of its axis. These properties allow use of the new damper for shock absorption on vehicle seats in the event of rear end collisions. The thermoplastic material of the absorber sleeve has the property that it "flows" so to speak over the expansion bead by elastic deformation when stressed, the absorber sleeve subsequently resuming its original diameter.

The piston is introduced into the absorber sleeve in basically the same way as during the actual stress, but considerably more slowly in order reliably to prevent permanent overstretching of the absorber sleeve. In other words, the piston is pressed slowly into the absorber sleeve.

The piston and piston rod are of steel or of a suitable plastics material such as polyamide, optionally reinforced with glass fibres. Depending on the application, the piston rod and the absorber sleeve are provided with corresponding connections; the end of the piston rod, for example, to a head for pushing through a screw and the absorber sleeve, for example, to an abutment which also has a head or flange for fixing purposes. The piston rod should be mounted at least in one slideway, advantageously more desirably in two slideways, that is preferably at the ends of an abutment in which the absorber sleeve is fixed. However, the piston rod and abutment can also have flanges for fixing purposes. If necessary, at least one flange can be arranged at an angle to the axis of the absorber sleeve and piston rod if the constructional parameters necessitate this. It is important merely that the absorber sleeve has sufficient external clearance round it in the radial direction always to leave space from other components as it is deformed by the piston or expansion bead.

The cross-sectional geometry of the piston or of the expansion bead and of the absorber sleeve will generally be round, simply for reasons of production. However, an elliptical or polygonal cross-sectional shape is certainly also feasible.

If the piston has several expansion beads, higher energy can be absorbed. The distance between expansion beads has an effect. The greater this distance, the more the absorber sleeve can contract again between them. If necessary, the external diameter of the expansion beads can be selected differently. Depending on the stress direction, if the thicker expansion bead is stressed first, more energy is absorbed in a shorter distance than in the opposite direction in which the thinner expansion bead reacts first. This embodiment is advantageous whenever faster energy absorption is to be achieved in one direction than in the opposite direction.

If the expansion bead is constructed in the longitudinal section, there is the alternative between a continuous external contour and a discontinuous external contour.

A sinusoidal external contour should be offered most frequently, but any other continuous curvature can offer its advantages in special cases. The contour generally extends outwardly in the form of a hollow groove from the piston, then passes into the opposite curvature and, after reaching the maximum diameter, preferably passes in a mirror image to the course just described back into the piston rod or the piston. Bevels which enclose an angle preferably of 30° to 60° with the central axis of the piston or expansion bead are provided for the discontinuous course of the external contour. The greater this angle, the stronger the absorption. Starting from the piston, a bevel with a greater angle which then kinks into a bevel of smaller angle will generally be selected. A cylindrical portion of maximum diameter then follows. The expansion bead can also be provided with bevels having a different angle on the other side. It goes without saying that curved portions can be combined with bevels.

If the absorber sleeve has a wall thickness which increases in at least one stress direction, a desired damping characteristic is achieved. If the wall thickness increases, then the damping also increases if there is a stress in this direction; it decreases in a similar manner if the wall thickness decreases. The change in the wall thickness can also be achieved by external ribs or, in extreme cases, internal grooves in the longitudinal direction. Peripheral beads provided externally on the absorber sleeve or annular grooves provided internally also produce similar properties to several expansion beads.

Two embodiments of the novel damper are shown purely schematically in section in the drawings and are described in more detail below.

Figure 1:
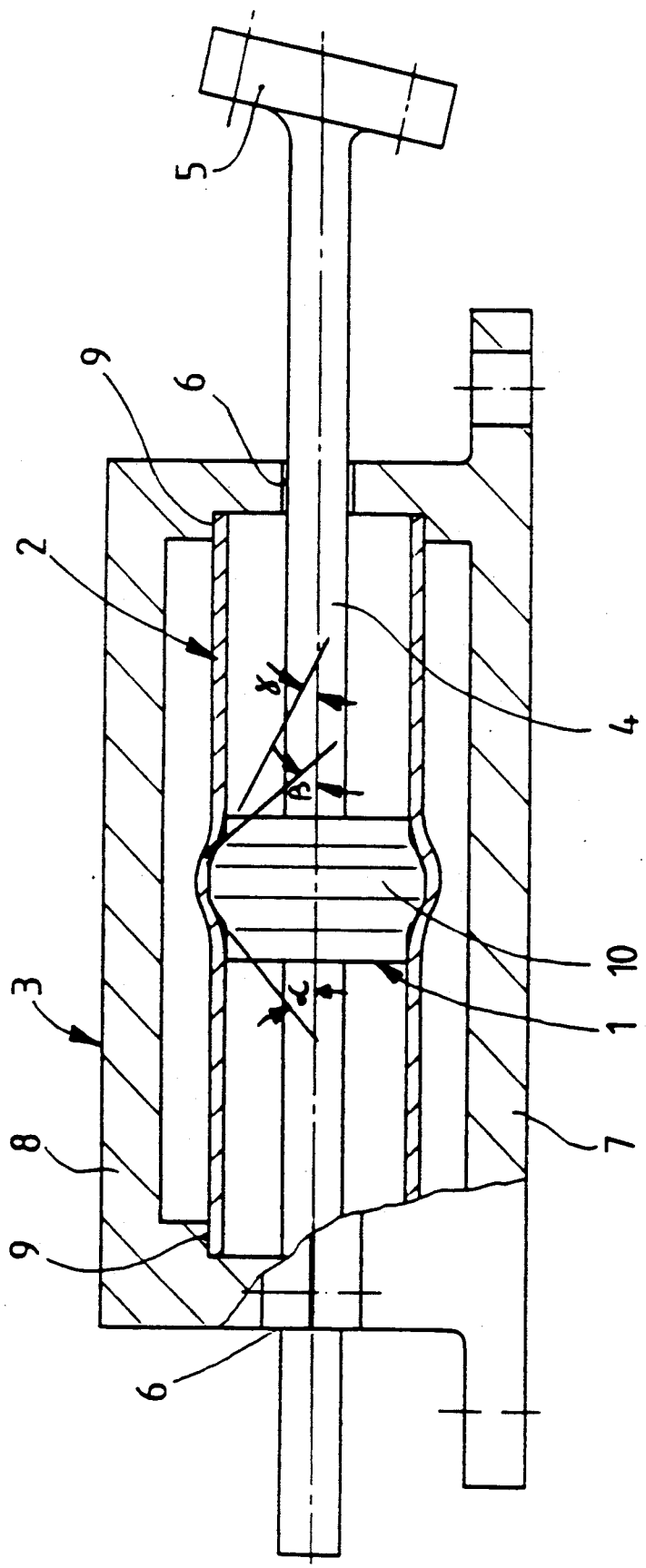
FIG. 1 shows a first embodiment of the damper.

In FIG. 1, the damper consists of a piston 1, an absorber sleeve 2 and an abutment 3 for the absorber sleeve 2. The piston 1 is arranged on a piston rod 4 which has a connecting flange 5 at one end and is mounted on both sides in the abutment 3 in slideways 6. Piston 1, piston rod 4 and connecting flange 5 are produced from steel. The abutment 3 consists of two forged metallic bearing bushes 7 and 8, of which the bearing bush 7 can be fixed on a foundation and the bearing bush 8, as a lid, is screwed to the bearing bush 7 so that the absorber sleeve 2 is clamped in centering means 9. The piston 1 has an expansion bead 10 of which the maximum external diameter is greater than the internal diameter of the absorber sleeve 2. From left to right in the drawing, the piston 1 or the expansion bead 10 has the following geometry: a 5 mm wide cylindrical portion and an external diameter corresponding to the internal diameter of the absorber sleeve 2, a 5 mm wide portion (bevel) widening conically at an angle $\alpha$ of 45°, a 5 mm wide cylindrical portion of maximum diameter, a 2 mm wide portion tapering conically at an angle $\beta$ of 30°, a further 3 mm wide portion tapering conically but at an angle $\gamma$ of 45° and a portion corresponding to the first portion in diameter and width. The absorber sleeve 2 has an internal diameter of 47 mm in the undeformed region and of 50 mm in the region which is deformed to a maximum. Its wall thickness in the undeformed region is 1.5 mm. It consists of a blend of polycarbonate and acrylonitrile-butadiene-styrene-copolymer having a tensile strength $\sigma_R$ of 50 MPa, an elongation at break $\epsilon_R$ of 85%, a tensile stress at yield $\sigma_S$ of 55 MPa, an elongation $\epsilon_S$ of 5.5% and an elongation modulus $\epsilon_Z$ of 2200 MPa (commercial product ®Bayblend T 85 MN made by Bayer AG, Leverkusen, Federal Republic of Germany, according to Code of Practice, Order No. KU 46151, edition 8.84, D4-838/845319).

Figure 2:
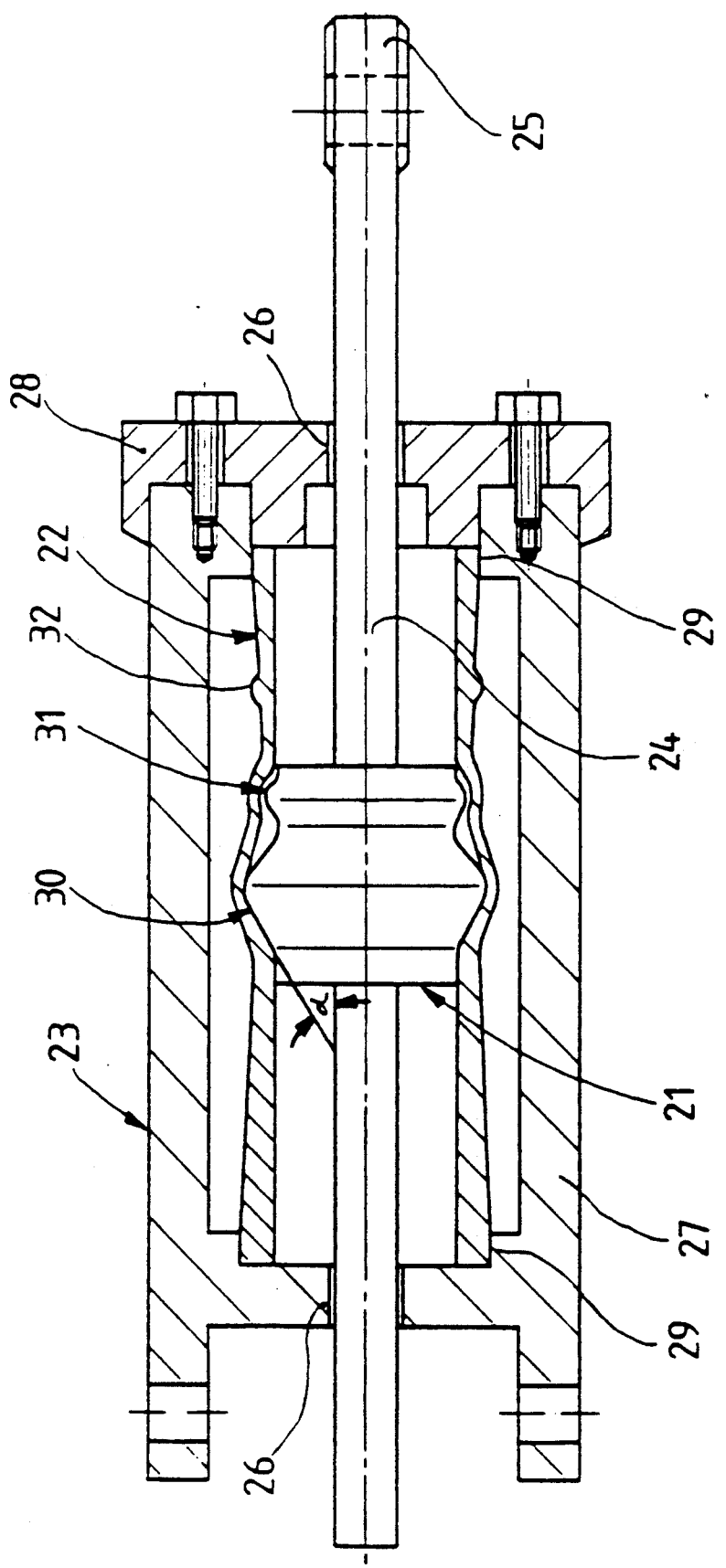
FIG. 2 shows a second embodiment.

In FIG. 2, the damper consists of a piston 21, an absorber sleeve 22 and an abutment 23 for the absorber sleeve 22. The piston 21 is arranged on a piston rod 24 which has a connecting head 25 at one end and is mounted in slideways 26 on both sides. The piston 21 and the piston rod 24 are produced from glass fibre reinforced epoxide resin. The abutment 23 also produced from glass fibre reinforced epoxide resin consists of a sleeve 27 and a lid 28 which are screwed together and clamp the absorber sleeve 22 in centering means 29. The piston 21 is provided with two expansion beads 30, 31 which pass into one another. The piston 21 and the expansion beads 30 and 31 have the following geometry in the illustration, from left to right: a 6 mm wide cylindrical portion and a diameter corresponding to the internal diameter of the absorber sleeve 22, a 10 mm wide portion which widens conically at an angle $\alpha$ of 30°, passes into a sine curve and reaches the maximum diameter, a 10 mm wide portion until a minimum diameter which is smaller than the internal diameter of the absorber sleeve 22 is reached, a portion with a sinusoidal shape increasing again to a second, but smaller maximum diameter, which is greater than the internal diameter of the absorber sleeve 22, and finally a 6 mm wide portion in which the sinusoidal shape decreases again and passes into the cylindrical shape corresponding to the internal diameter of the absorber sleeve 22. At the point at which the piston 21 is placed after insertion, the absorber sleeve 22 has a wall thickness of 3 mm in the undeformed state. The internal diameter is 30 mm in the undeformed state. In the illustration, the wall thickness increases continuously to 4 mm going out in both directions from the position of the piston 21. To the right, the absorber sleeve 22 has an external bead 32 having an external diameter of 40 mm. It consists of a blend of polycarbonate and polybutylene terephthalate having a tensile strength $\sigma_R$ of 57 MPa and an elongation at break of 120% as well as a tensile yield $\sigma_S$ of 55 MPa and an elongation of 4% and an elongation modulus $\epsilon_Z$ of 2200 MPa. (Commercial product ®Makroblend PR 51 produced by Bayer AG, Leverkusen, Federal Republic of Germany, according to Code of Practice KU 47.404 dated 15.6.1987).

We claim:

1. Damper in the form of a shock absorber comprising an annular absorber sleeve of plastics material and a piston co-operating therewith arranged inside the absorber sleeve for shock absorbing motions in to and fro directions, the piston having at least one expansion bead the external diameter of which is greater than the internal diameter of the undeformed absorber sleeve, the absorber sleeve comprising a thermoplastic material having a tensile strength $\sigma_R$ of at least 40 MPa, an elongation at break $\epsilon_R$ of at least 60%, a tensile stress at yield $\sigma_S$ of at least 40 MPa and an elongation at yield $\epsilon_S$ of at least 3.5% (according to ISO/R 527 or DIN 53 455 in each case), and a support housing for the sleeve spaced outwardly away from the undeformed and deformed surfaces of the sleeve said support housing end portions mounting opposite ends of the sleeve therein.

2. Damper according to claim 1 wherein the absorber sleeve comprises a blend of polycarbonate and acrylonitrile-butadiene-styrene-copolymer.

3. Damper according to claim 1 wherein the absorber sleeve comprises a blend of polycarbonate and polybutylene terephthalate.

4. Damper according to claim 1, wherein the piston has several expansion beads.

5. Damper according to claim 1, wherein the piston or the expansion bead has a constant external contour in a longitudinal section.

6. Damper according to claim 1, wherein the piston or the expansion bead has a discontinuous external contour.

* * * * *